US012002971B2

(12) United States Patent
Ko et al.

(10) Patent No.: US 12,002,971 B2
(45) Date of Patent: Jun. 4, 2024

(54) BUTTON CELL (71) Applicant: SAMSUNG SDI CO., LTD., Yongin-si (KR)

(72) Inventors: Heejung Ko, Yongin-si (KR); Kijung Kim, Yongin-si (KR); Yongjin Park, Yongin-si (KR); Byongchul Woo, Yongin-si (KR); Jong-Ha Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 49 days.

(21) Appl. No.: 17/139,256

(22) Filed: Dec. 31, 2020

(65) Prior Publication Data
US 2021/0399368 A1  Dec. 23, 2021

(30) Foreign Application Priority Data

Jun. 23, 2020 (KR) .................. 10-2020-0076595

(51) Int. Cl.
*H01M 50/109* (2021.01)
*H01M 10/04* (2006.01)
(Continued)

(52) U.S. Cl.
CPC ..... *H01M 50/109* (2021.01); *H01M 10/0427* (2013.01); *H01M 50/154* (2021.01); *H01M 50/181* (2021.01)

(58) Field of Classification Search
CPC ............ H01M 50/109; H01M 50/181; H01M 50/154; H01M 10/0427
See application file for complete search history.

(56) References Cited

U.S. PATENT DOCUMENTS 3,966,498 A  6/1976  Wuthrich
2013/0196219 A1*  8/2013  Kim ................. H01M 50/147
429/179

(Continued)

FOREIGN PATENT DOCUMENTS

CN  105609862 A  5/2016
CN  113823876 A  12/2021
(Continued)

OTHER PUBLICATIONS

European Search Report for corresponding European Patent Application No. 21165303.5, European Search Report dated Aug. 26, 2021 (7 pgs.).

(Continued)

*Primary Examiner* — Matthew T Martin
*Assistant Examiner* — Taylor Harrison Krone
(74) *Attorney, Agent, or Firm* — Lewis Roca Rothgerber Christie LLP (57) ABSTRACT A rechargeable battery includes: an electrode assembly including a first electrode, a second electrode, and a separator between the first electrode and the second electrode; a case configured to be connected to the first electrode to accommodate the electrode assembly, and including an opening to receive the electrode assembly; a cap plate configured to be coupled with the case to cover an outer area of the opening, and including a through-hole to expose a central area of the opening; and a terminal plate configured to be connected to the second electrode and to be insulation-bonded to the cap plate, and including a flange portion covering the through-hole, and a protrusion penetrating the through-hole from the flange portion.

12 Claims, 5 Drawing Sheets (51) Int. Cl.
*H01M 50/148* (2021.01)
*H01M 50/181* (2021.01)

(56) References Cited

U.S. PATENT DOCUMENTS

| | | | |
|---|---|---|---|
| 2013/0260212 | A1 | 10/2013 | Kohno et al. |
| 2014/0242439 | A1* | 8/2014 | Hattori ................ H01M 50/147 |
| | | | 429/121 |
| 2015/0243940 | A1* | 8/2015 | Kang .................. H01M 50/528 |
| | | | 429/179 |
| 2016/0141591 | A1 | 5/2016 | Lee |
| 2017/0187025 | A1* | 6/2017 | Watanabe ............. H01M 50/40 |
| 2018/0040918 | A1* | 2/2018 | Guen .................. H01M 50/581 |
| 2020/0020896 | A1* | 1/2020 | Lim ...................... H01M 50/55 |
| 2021/0399373 | A1 | 12/2021 | Ko et al. |

FOREIGN PATENT DOCUMENTS

| | | |
|---|---|---|
| DE | 26 10 414 A1 | 9/1976 |
| EP | 3 926 743 A1 | 12/2021 |
| GB | 1 544 711 A | 4/1979 |

OTHER PUBLICATIONS

European Office Action dated Aug. 28, 2023 issued in corresponding European Patent Application No. 21 165 303.5 (6 pages).
Chinese Office Action dated Feb. 27, 2024 issued in corresponding Chinese Patent Application No. 202110320120.X (21 pages, including 13 pages of English translation).

\* cited by examiner

BUTTON CELL

CROSS-REFERENCE TO RELATED APPLICATION

This application claims priority to and the benefit of Korean Patent Application No. 10-2020-0076595, filed on Jun. 23, 2020 in the Korean Intellectual Property Office, the entire content of which is incorporated herein by reference.

BACKGROUND

1. Field

Aspects of embodiments of the present disclosure relate to a rechargeable battery.

2. Description of the Related Art

Generally, a rechargeable battery is a battery that may be repeatedly charged and discharged.

Recently, as the demand for wearable devices, such as headphones, earphones, smartwatches, and body-attached medical devices, the use of wireless communication such as Bluetooth increases, and the need for ultra-small rechargeable batteries to be mounted on the wearable devices is increasing.

Since such an ultra-small rechargeable battery has a small size of each of both electrode terminals, a short circuit may occur between the both electrode terminals when an assembly error occurs to both electrode terminals.

The above information disclosed in this Background section is only for enhancement of understanding of the background of the invention, and, therefore, it may contain information that does not form the prior art that is already known in this country to a person of ordinary skill in the art.

SUMMARY

According to an aspect of one or more embodiments of the present invention, a rechargeable battery is provided in which a short circuit between both electrode terminals may be suppressed even if an assembly error occurs therein.

According to another aspect of one or more embodiments of the present invention, a rechargeable battery is provided in which damage to an electrode terminal due to a pressure may be suppressed.

According to another aspect of one or more embodiments of the present invention, a rechargeable battery is provided in which a risk of explosion may be suppressed even if a temperature and pressure are unintentionally increased inside the rechargeable battery.

According to one or more embodiments, a rechargeable battery includes: an electrode assembly including a first electrode, a second electrode, and a separator between the first electrode and the second electrode; a case configured to be connected to the first electrode to accommodate the electrode assembly, and including an opening to receive the electrode assembly; a cap plate configured to be coupled with the case to cover an outer area of the opening, and including a through-hole to expose a central area of the opening; and a terminal plate configured to be connected to the second electrode and to be insulation-bonded to the cap plate, and including a flange portion covering the through-hole, and a protrusion penetrating the through-hole from the flange portion, wherein the protrusion includes a curved surface extending from a surface of the flange portion.

The protrusion may further include an inclined surface extending from the curved surface and penetrating the through-hole.

A first length between the inclined surface and an edge of the through-hole may be longer than a second length between the curved surface and the edge of the through-hole.

The rechargeable battery may further include a thermal-fusion layer between the cap plate and the flange portion, and configured to insulation-bond the cap plate and the flange portion.

The thermal-fusion layer may melt at a predetermined temperature.

The flange portion may be arranged on the cap plate, and the protrusion may pass through the through-hole from the flange portion to be connected to the second electrode.

The flange portion may be disposed between the cap plate and the electrode assembly to be connected to the second electrode, and the protrusion may pass through the through-hole from the flange portion to be exposed to an outside of the cap plate.

The flange portion may have a wider area than that of the protrusion.

The flange portion may have a thinner thickness than that of the protrusion.

The flange portion and the protrusion may be integrally formed.

The case and the cap plate may have a same polarity as the first electrode, and the terminal plate may have a same polarity as the second electrode.

The electrode assembly may further include: a first electrode tab extending from the first electrode to be coupled to the case; and a second electrode tab extending from the second electrode to be coupled to the terminal plate.

According to one or more embodiments, a rechargeable battery is provided in which a short circuit between both electrode terminals may be suppressed even if an assembly error occurs therein.

In addition, according to one or more embodiments, a rechargeable battery is provided in which damage to an electrode terminal due to a pressure may be suppressed.

Further, according to one or more embodiments, a rechargeable battery is provided in which a risk of explosion may be suppressed even if a temperature and pressure are unintentionally increased inside the rechargeable battery.

| DESCRIPTION OF REFERENCE DESIGNATORS | |
|---|---|
| 100: electrode assembly | 200: case |
| 300: cap plate | 400: terminal plate |
| 410: flange portion | 420: protrusion |
| CS: curved surface | |

DETAILED DESCRIPTION

The present invention will be described more fully herein with reference to the accompanying drawings, in which some example embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, unless explicitly described to the contrary, it is to be understood that terms such as "comprises," "includes," or "have" used in the present specification specify the presence of stated features, numerals, steps, operations, components, parts, or a combination thereof, but do not preclude the presence or addition of one or more other features, numerals, steps, operations, components, parts, or a combination thereof.

Also, in this specification, it is to be understood that when one component is referred to as being "connected" or "coupled" to another component, it may be connected or coupled directly to the other component or connected or coupled to another component with one or more other components intervening therebetween.

Singular forms are to include plural forms unless the context clearly indicates otherwise.

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Herein, a rechargeable battery according to an embodiment will be described with reference to FIG. 1 to FIG. 3.

The rechargeable battery according to an embodiment is an ultra-small rechargeable battery, and may include a coin cell or a button cell, but the present invention is not limited thereto, and, in another embodiment, may include a cylindrical or pin-type cell.

Here, the coin cell or the button cell is a thin coin-type or button-type cell, and may refer to a battery having a ratio (height/diameter) of a height to a diameter of 1 or less, but is not limited thereto. In an embodiment, the coin cell or the button cell is cylindrical, and a horizontal cross-section is circular, but the present invention is not limited thereto, and, in another embodiment, a horizontal cross-section may be oval or polygonal. In this case, the diameter may refer to a maximum distance of the cell based on a horizontal direction of the cell, and the height may refer to a maximum distance (distance from a flat bottom surface thereof to a flat uppermost surface) of the cell based on a vertical direction of the cell.

Figure 1:
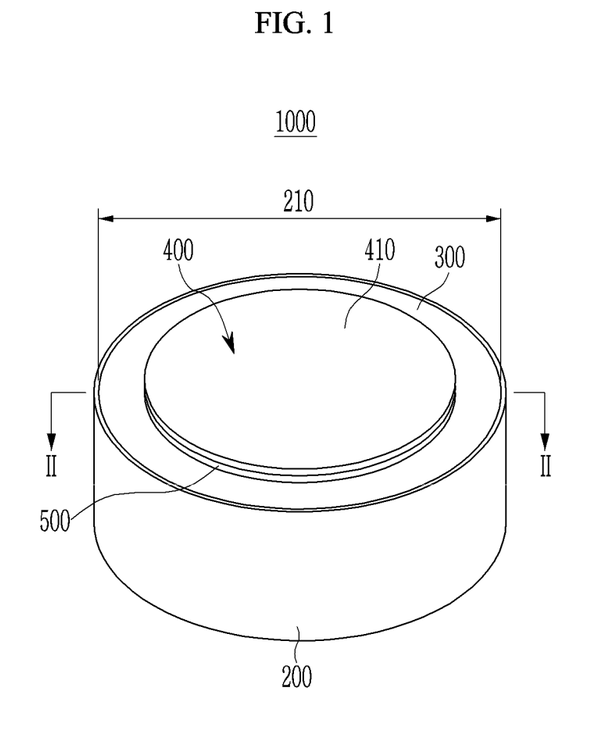
FIG. 1 illustrates a perspective view of a rechargeable battery according to an embodiment.
Figure 2:
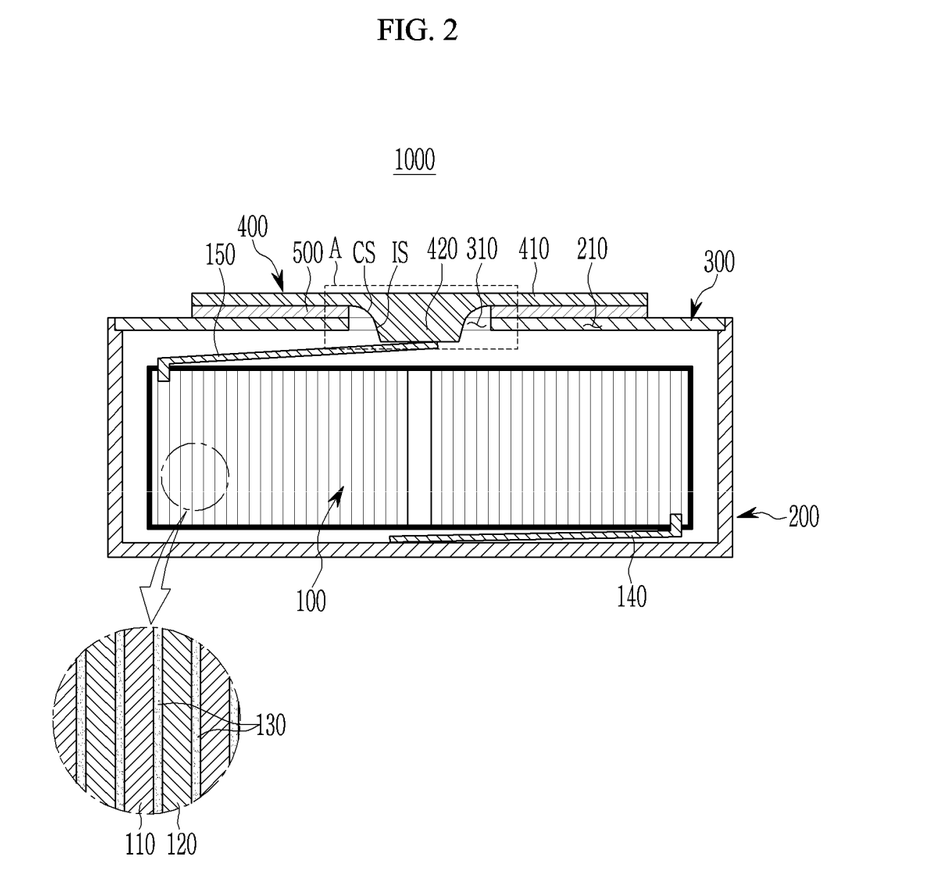
FIG. 2 illustrates a cross-sectional view taken along the line II-II of FIG. 1.

FIG. 1 illustrates a perspective view of a rechargeable battery according to an embodiment; and FIG. 2 illustrates a cross-sectional view taken along the line II-II of FIG. 1.

Referring to FIG. 1 and FIG. 2, a rechargeable battery 1000 according to an embodiment includes an electrode assembly 100, a case 200, a cap plate 300, a terminal plate 400, and a thermal-fusion layer 500.

The electrode assembly 100 is accommodated in the case 200. A lower portion of the electrode assembly 100 faces a bottom portion of the case 200, and an upper portion of the electrode assembly 100 faces the cap plate 300 covering an opening 210 of the case 200 and the terminal plate 400. In an embodiment, the upper and lower portions of the electrode assembly 100 may have planar shapes that are parallel to each other, but are not limited thereto.

The electrode assembly 100 includes a first electrode 110, a second electrode 120, a separator 130, a first electrode tab 140, and a second electrode tab 150.

The first electrode 110 and the second electrode 120 are spaced apart from each other, and the separator 130 including an insulating material is disposed between the first electrode 110 and the second electrode 120. In an embodiment, the first electrode 110 may be an anode and the second electrode 120 may be a cathode, but the present invention is not limited thereto, and, in another embodiment, the first electrode 110 may be a cathode and the second electrode 120 may be an anode.

In an embodiment, the first electrode 110 has a shape of a band extending in a direction, and includes an anode coated region that is a region where an anode active material layer is coated to a current collector of a metal foil (for example, a Cu foil), and an anode uncoated region that is a region where an active material is not coated. The anode uncoated region may be disposed at an end portion in an extending direction of the first electrode 110.

In an embodiment, the second electrode 120 has a band shape and is spaced apart from the first electrode 110 to extend in a direction with the separator 130 interposed therebetween, and includes a cathode coated region that is a region where a cathode active material layer is coated to a current collector of a metal foil (for example, an Al foil), and a cathode uncoated region that is a region where an active material is not coated. The cathode uncoated region may be disposed at an end portion in an extending direction of the second electrode 120.

The separator 130 extends in a direction between the first electrode 110 and the second electrode 120 to prevent or substantially prevent a short circuit between the first electrode 110 and the second electrode 120.

In an embodiment, the first electrode 110, the separator 130, and the second electrode 120 are sequentially stacked and wound in a jelly roll shape, but are not limited thereto, and may be formed in any of various known shapes. Each of the first electrode 110, the second electrode 120, and the separator 130 may include any of various known materials.

The first electrode tab 140 extends from the first electrode 110 of the electrode assembly 100 to the case 200. The first electrode tab 140 is coupled to a bottom portion of the case 200 to connect the first electrode 110 and the case 200. The first electrode tab 140 contacts the first electrode 110 and the case 200. By the first electrode tab 140, the case 200 has a same polarity as that of the first electrode 110.

The second electrode tab 150 extends from the second electrode 120 of the electrode assembly 100 to the terminal plate 400. The second electrode tab 150 is coupled to a protrusion 420 of the terminal plate 400 to connect the second electrode 120 and the terminal plate 400. The second electrode tab 150 contacts the second electrode 120 and the terminal plate 400. By the second electrode tab 150, the terminal plate 400 has a same polarity as that of the second electrode 120.

In an embodiment, a center pin penetrating a center of the electrode assembly 100 in a vertical direction may be positioned at a center portion of the electrode assembly 100, and the center pin may support the first electrode tab 140 and the second electrode tab 150, but is not limited thereto.

The case 200 is coupled to the first electrode 110 of the electrode assembly 100 to house the electrode assembly 100. The case 200 includes an opening 210 that exposes an upper portion of the electrode assembly 100. The bottom portion of the case 200 is connected to the first electrode 110 of the electrode assembly 100 by the first electrode tab 140 to have the same polarity as that of the first electrode 110. In an embodiment, the case 200 has a cylinder shape for accommodating the electrode assembly 100 of a jelly roll shape, but is not limited thereto, and may have any of various shapes. The case 200 may accommodate any of various known electrolyte solutions along with the electrode assembly 100. In an embodiment, an outer surface of the case 200 may be a first electrode terminal of the rechargeable battery 1000, but is not limited thereto. In an embodiment, an outer surface of a flange portion 410 that is an outer surface of the terminal plate 400 may be a second electrode terminal of the rechargeable battery 1000, but is not limited thereto. In an embodiment, a plating layer may be coated on the outer surface of the case 200, but the present invention is not limited thereto, and any of various known coating layers may be coated on the outer surface of the case 200.

The opening 210 of the case 200 is covered by the cap plate 300 and the terminal plate 400.

The cap plate 300 is combined with the case 200 to cover an outer area of the opening 210. The cap plate 300 includes a through-hole 310 that exposes a central area of the opening 210. In an embodiment, the cap plate 300 is directly coupled to a side wall of the case 200 in which the opening 210 of the case 200 is formed by a welding process to cover the outer area of the opening 210. In an embodiment, the cap plate 300 has a ring shape by the through-hole 310 formed in a central portion thereof, but is not limited thereto. The cap plate 300 is combined with the case 200 to have the same polarity as that of the first electrode 110. In an embodiment, the cap plate 300 contains stainless steel, but is not limited thereto, and may contain a metal, such as any of aluminum, nickel, and copper. In an embodiment, an outer surface of the cap plate 300 may be a first electrode terminal of the rechargeable battery 1000, but is not limited thereto.

In an embodiment, a plating layer may be coated on the outer surface of the cap plate 300, but the present invention is not limited thereto, and any of various known coating layers may be coated on the outer surface of the cap plate 300.

The terminal plate 400 is connected to the second electrode 120 to be insulation-coupled to the cap plate 300. The terminal plate 400 covers the through-hole 310 of the cap plate 300. The terminal plate 400 is disposed on the cap plate 300. The terminal plate 400 covers the central area of the opening 210 of the case 200 exposed by the through-hole 310 of the cap plate 300. The terminal plate 400 covers the central area of the opening 210, and the cap plate 300 covers the outer area of the opening 210, and, thus, the opening 210 of the case 200 is completely covered by the terminal plate 400 and the cap plate 300. The terminal plate 400 is coupled to the second electrode tab 150 of the electrode assembly 100 to be connected to the second electrode 120 of the electrode assembly 100. The terminal plate 400 has the same polarity as that of the second electrode 120.

The terminal plate 400 includes the flange portion 410 and the protrusion 420.

The flange portion 410 is disposed on the cap plate 300, and overlaps the cap plate 300 to cover the through-hole 310. The flange portion 410 has a larger area than the protrusion 420. For example, the flange portion 410 may have a larger diameter than the protrusion 420. In an embodiment, the flange portion 410 has a thinner thickness than the protrusion 420, but is not limited thereto. A lower surface of the flange portion 410 is in contact with the thermal-fusion layer 500, and the flange portion 410 is insulation-bonded to the cap plate 300 by the thermal-fusion layer 500. In an embodiment, an outer surface of the flange portion 410 may be the second electrode terminal of the rechargeable battery 1000.

The protrusion 420 protrudes from the flange portion 410 to penetrate the through-hole 310. The protrusion 420 passes through the through-hole 310 from the flange portion 410 to be connected to the second electrode 120. A lower surface of the protrusion 420 is in contact with the second electrode tab 150. As the protrusion 420 is coupled with the second electrode tab 150, the protrusion 420 and the flange portion 410 of the terminal plate 400 have the same polarity as that of the second electrode 120.

In an embodiment, the protrusion 420 and the flange portion 410 are integrally formed, but are not limited thereto, and, in another embodiment, different materials may be combined to form the terminal plate 400.

In an embodiment, a plating layer may be coated on the outer surface of the terminal plate 400, but the present invention is not limited thereto, and any of various known coating layers may be coated on the outer surface of the terminal plate 400.

Figure 3:
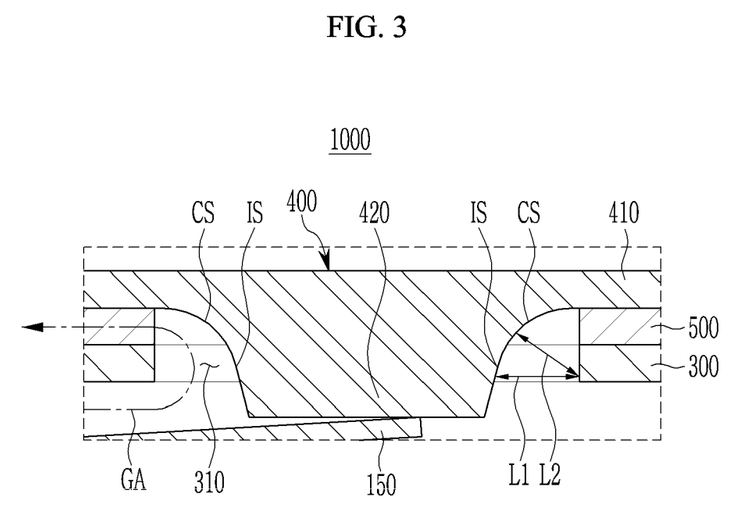
FIG. 3 illustrates a cross-sectional view of a region "A" of FIG. 2.

FIG. 3 illustrates a cross-sectional view of a region "A" of FIG. 2.

Referring to FIG. 3, in an embodiment, a surface of the protrusion 420 includes a curved surface CS and an inclined surface IS.

The protrusion 420 includes the curved surface CS extending from a lower surface of the flange portion 410, and the inclined surface IS extending from the curved surface CS to pass through the through-hole 310.

The curved surface CS may have a curvature radius (e.g., a predetermined curvature radius), and the inclined surface IS may have a slope (e.g., a predetermined slope).

In an embodiment, since the protrusion 420 includes the curved surface CS extending from the lower surface of the flange portion 410, a first length L1 between the inclined surface IS and the cap plate 300, which is an edge of the through-hole 310, is longer than a second length L2 between the curved surface CS and the cap plate 300, which is an edge of the through-hole 310.

In an embodiment, the protrusion 420 includes an inclined straight line type of inclined surface IS that extends from the curved surface CS and passes through the through-hole 310, and, thus, as the surface of the protrusion 420 is closer to an end portion of the inclined surface IS from the curved surface CS, it is farther away from the cap plate 300, which is an edge of the through-hole 310.

Since the protrusion 420 of the terminal plate 400 includes the curved surface CS and the inclined surface IS that extend from the lower surface of the flange portion 410, as the surface of the protrusion 420 is closer to the end of the inclined surface IS from the curved surface CS, it becomes farther from the cap plate 300, which is the edge of the through hole 310, and, thus, even if an assembly error occurs in a horizontal direction between the cap plate 300 and the terminal plate 400, it is possible to suppress a short circuit from occurring between the cap plate 300 having the same polarity as the first electrode 110 and the terminal plate 400 having the same polarity as the second electrode 120, which may be both electrode terminals.

In addition, since the protrusion 420 of the terminal plate 400 includes the curved surface CS extending from the surface of the flange portion 410, even if unintended pressure is applied to the terminal plate 400, a stress due to the pressure is dispersed in the curved surface CS positioned between the protrusion 420 and the flange portion 410, and, thus, it is possible to suppress damage from occurring between the flange portion 410 and the protrusion 420 by the pressure.

In addition, since the protrusion 420 of the terminal plate 400 includes the curved surface CS extending from the surface of the flange portion 410, when an unintended event (such as a short circuit between both electrodes) occurs in an internal space of the rechargeable battery 1000 such that an internal pressure increases by a gas GA generated due to an increase in temperature in the internal space of the rechargeable battery 1000, the thermal-fusion layer 500 may melt due to the increased temperature and may be discharged to the outside by the internal pressure, such that a space between the flange portion 410 and the cap plate 300 is formed as a ventilation channel, and, at the same time, the gas GA is guided from the internal space of the rechargeable battery 1000 along the curved surface CS of the terminal plate 400 to the space between the flange portion 410 and the cap plate 300, which is the ventilation channel, to be discharged to the outside, and, thus, it is possible to suppress a risk of explosion of the rechargeable battery 1000.

The thermal-fusion layer 500 is disposed between the cap plate 300 and the flange portion 410 of the terminal plate 400, and insulation-bonds the cap plate 300 and the flange portion 410 of the terminal plate 400. The thermal-fusion layer 500 contains an insulating material, and insulates between the cap plate 300 and the terminal plate 400. In an embodiment, the thermal-fusion layer 500 is thermally fusion-bonded between the cap plate 300 and the flange portion 410 of the terminal plate 400 by heat or a laser beam. The thermal bonding layer 500 may include any of various known materials that insulation-bond the cap plate 300 and the terminal plate 400. Since the cap plate 300 and the terminal plate 400 are bonded by the thermal-fusion layer 500, the opening 210 of the case 200 in which the electrode assembly 100 is accommodated is completely sealed by the cap plate 300, the terminal plate 400, and the thermal-fusion layer 500.

In an embodiment, the thermal-fusion layer 500 is cured by heat, but may be melted at a predetermined temperature. In an embodiment, the predetermined temperature at which the thermal-fusion layer 500 melts may be a temperature exceeding a temperature of heat for curing the thermal-fusion layer 500, but is not limited thereto.

For example, the thermal-fusion layer 500 may include a thermosetting resin and a thermoplastic resin. In an embodiment, a thermosetting resin and a thermoplastic resin of the thermal-fusion layer 500 may be stacked in a plurality of layers, but are not limited thereto. The thermosetting resin of the thermal-fusion layer 500 is cured by heat, and may include any of various known thermosetting resins, such as any of a phenol resin, a urea resin, a melamine resin, an epoxy resin, and a polyester resin. In an embodiment, the thermoplastic resin of the thermal-fusion layer 500 includes a polypropylene resin that melts at a predetermined temperature, but is not limited thereto, and, in another embodiment, may include any of various known thermoplastic resins, such as any of polystyrene, polyethylene, and polyvinyl chloride resins.

As described above, in the rechargeable battery 1000 according to an embodiment, since the protrusion 420 of the terminal plate 400 insulation-bonded to the cap plate 300 includes the curved surface CS and the inclined surface IS that extend from the lower surface of the flange portion 410, as the surface of the protrusion 420 passing through the through-hole 310 of the cap plate 300 is closer to the end of the inclined surface IS than the curved surface CS, it becomes farther from the cap plate 300, which is the edge of the through hole 310, and, thus, even if an assembly error occurs in a horizontal direction between the cap plate 300 and the terminal plate 400, it is possible to suppress a short circuit from occurring between the cap plate 300 having the same polarity as the first electrode 110 and the terminal plate 400 having the same polarity as the second electrode 120, which may be both electrode terminals.

That is, even if an assembly error occurs, it is possible to provide the rechargeable battery 1000 that suppresses a short circuit from occurring between both electrode terminals.

In addition, in the rechargeable battery 1000 according to an embodiment, since the protrusion 420 of the terminal plate 400, which is an electrode terminal, includes the curved surface CS extending from the lower surface of the flange portion 410, even if unintended pressure is applied to the terminal plate 400, a stress due to the pressure may be dispersed in the curved surface CS positioned between the protrusion 420 and the flange portion 410, and, thus, it is possible to suppress damage from occurring between the flange portion 410 and the protrusion 420 by the pressure being suppressed.

That is, the rechargeable battery 1000 is provided that may suppress the electrode terminal from being damaged due to a pressure.

In addition, in the rechargeable battery 1000 according to an embodiment, since the protrusion 420 of the terminal plate 400 insulation-bonded to the cap plate 300 by the thermal-fusion layer 500 includes the curved surface CS extending from the surface of the flange portion 410, when an unintended event (such as a short circuit between both electrodes) occurs in an internal space of the rechargeable battery 1000 such that internal pressure increases by a gas GA generated due to an increase in temperature in the internal space of the rechargeable battery 1000, the thermal-fusion layer 500 may melt due to the increased temperature and may be discharged to the outside by the internal pressure, such that a space between the flange portion 410 and the cap plate 300 is formed as a ventilation channel, and, at the same time, the gas GA may be guided from the internal space of the rechargeable battery 1000 along the curved surface CS of the terminal plate 400 to the space between the flange portion 410 and the cap plate 300, which is the ventilation channel, to be discharged to the outside, and, thus, it is possible to suppress a risk of explosion of the rechargeable battery 1000.

That is, even if the temperature and pressure inside the rechargeable battery 1000 unintentionally increase, the rechargeable battery 1000 may suppress an explosion risk.

Herein, a rechargeable battery 1002 according to another embodiment will be described with reference to FIG. 4 and FIG. 5. Herein, elements that are different from those of the rechargeable battery according to the above-described embodiment will be mainly described.

Figure 4:
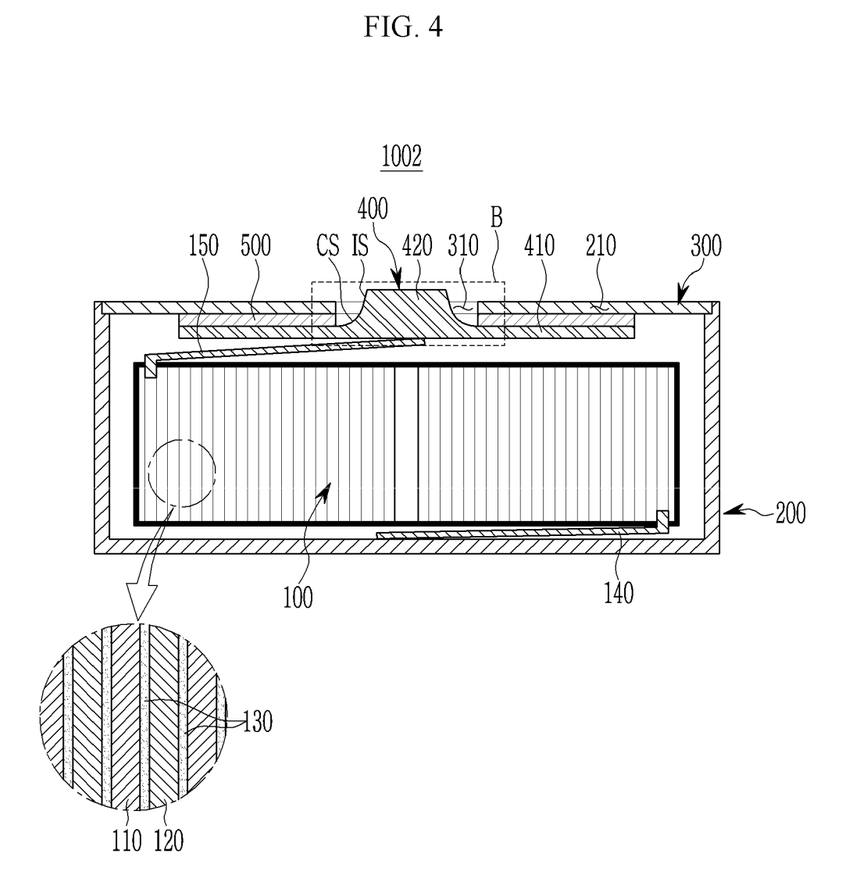
FIG. 4 illustrates a cross-sectional view of a rechargeable battery according to another embodiment.

FIG. 4 illustrates a cross-sectional view of a rechargeable battery according to another embodiment.

Referring to FIG. 4, the rechargeable battery 1002 according to another embodiment includes an electrode assembly 100, a case 200, a cap plate 300, a terminal plate 400, and a thermal-fusion layer 500.

The terminal plate 400 is connected to a second electrode 120 and insulation-coupled to the cap plate 300. The terminal plate 400 covers a through-hole 310 of the cap plate 300. The terminal plate 400 is disposed between the cap plate 300 and the electrode assembly 100. The terminal plate 400 covers a central area of an opening 210 of the case 200 exposed by the through-hole 310 of the cap plate 300. The terminal plate 400 covers a central area of the opening 210, and the cap plate 300 covers an outer area of the opening 210, and, thus, the opening 210 of the case 200 is completely covered by the terminal plate 400 and the cap plate 300. The terminal plate 400 is coupled to a second electrode tab 150 of the electrode assembly 100 to be connected to the second electrode 120 of the electrode assembly 100. The terminal plate 400 has a same polarity as that of the second electrode 120.

The terminal plate 400 includes a flange portion 410 and a protrusion 420.

The flange portion 410 is disposed between the cap plate 300 and the electrode assembly 100, and overlaps the cap plate 300 to cover the through-hole 310. The flange portion 410 has a larger area than the protrusion 420. For example, the flange portion 410 may have a larger diameter than the protrude portion 420. In an embodiment, the flange portion 410 has a thinner thickness than the protrusion 420, but is not limited thereto. An upper surface of the flange portion 410 is in contact with the thermal-fusion layer 500, and the flange portion 410 is insulation-bonded to the cap plate 300 by the thermal-fusion layer 500. The flange portion 410 is connected to the second electrode 120. In an embodiment, a lower surface of the flange portion 410 is in contact with the second electrode tab 150. As the flange portion 410 is coupled with the second electrode tab 150, the protrusion 420 and the flange portion 410 of the terminal plate 400 have the same polarity as that of the second electrode 120.

The protrusion 420 protrudes from the flange portion 410 to penetrate the through-hole 310. The protrusion 420 passes through the through-hole 310 from the flange portion 410 to be exposed to an outside of the cap plate 300. In an embodiment, an outer surface of the protrusion 420 may be the second electrode terminal of the rechargeable battery 1002.

In an embodiment, the protrusion 420 and the flange portion 410 are integrally formed, but are not limited thereto, and, in another embodiment, different materials may be combined to form the terminal plate 400.

The outer surface of the protrusion 420 may be disposed on a same plane as or on a different plane from an outer surface of the cap plate 300.

For example, a height of the outer surface of the protrusion 420 may be the same as that of the outer surface of the cap plate 300, but is not limited thereto, and the height of the outer surface of the protrusion 420 may be higher or lower than that of the outer surface of the cap plate 300.

Figure 5:
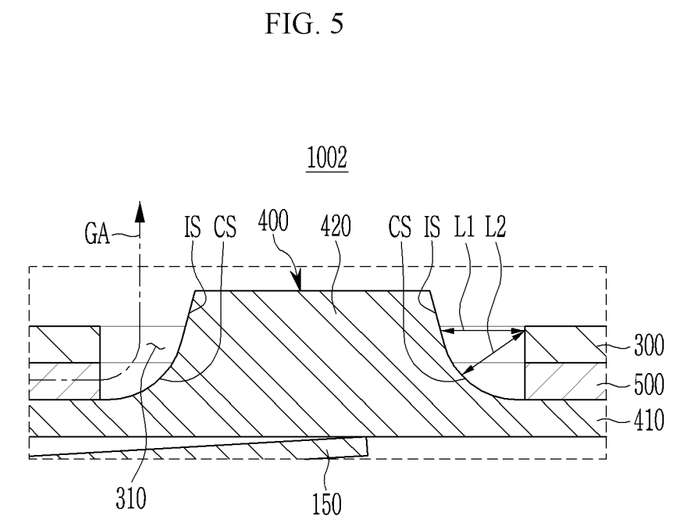
FIG. 5 illustrates a cross-sectional view of a region "B" of FIG. 4.

FIG. 5 illustrates a cross-sectional view of a region "B" of FIG. 4.

Referring to FIG. 5, in an embodiment, a surface of the protrusion 420 includes a curved surface CS and an inclined surface IS.

The protrusion 420 includes the curved surface CS extending from an upper surface of the flange portion 410, and the inclined surface IS extending from the curved surface CS to pass through the through-hole 310.

The curved surface CS may have a curvature radius (e.g., a predetermined curvature radius), and the inclined surface IS may have a slope (e.g., a predetermined slope).

Since the protrusion 420 includes the curved surface CS extending from the upper surface of the flange portion 410, a first length L1 between the inclined surface IS and the cap plate 300, which is an edge of the through-hole 310, is longer than a second length L2 between the curved surface CS and the cap plate 300, which is an edge of the through-hole 310.

In an embodiment, the protrusion 420 includes an inclined straight line type of inclined surface IS that extends from the curved surface CS and passes through the through-hole 310, and, thus, as the surface of the protrusion 420 is closer to an end portion of the inclined surface IS from the curved surface CS, it is farther away from the cap plate 300, which is an edge of the through-hole 310.

Since the protrusion 420 of the terminal plate 400 includes the curved surface CS and the inclined surface IS that extend from the upper surface of the flange portion 410, as the surface of the protrusion 420 is closer to the end of the inclined surface IS from the curved surface CS, it becomes farther from the cap plate 300, which is the edge of the through hole 310, and, thus, even if an assembly error occurs in a horizontal direction between the cap plate 300 and the terminal plate 400, a short circuit may be suppressed from occurring between the cap plate 300 having the same polarity as a first electrode 110 and the terminal plate 400 having the same polarity as the second electrode 120, which may be both electrode terminals.

In addition, since the protrusion 420 of the terminal plate 400 includes the curved surface CS extending from the upper surface of the flange portion 410, even if unintended pressure is applied to the terminal plate 400, a stress due to the pressure is dispersed in the curved surface CS positioned between the protrusion 420 and the flange portion 410, and, thus, damage may be suppressed from occurring between the flange portion 410 and the protrusion 420 by the pressure.

In addition, since the protrusion 420 of the terminal plate 400 includes the curved surface CS extending from the surface of the flange portion 410, when an unintended event (such as a short circuit between both electrodes) occurs in an internal space of the rechargeable battery 1002 such that internal pressure increases by a gas GA generated due to an increase in temperature in the internal space of the rechargeable battery 1002, the thermal-fusion layer 500 may melt due to the increased temperature and may be discharged to the outside by the internal pressure, such that a space between the flange portion 410 and the cap plate 300 is formed as a ventilation channel, and, at the same time, the internal gas GA may be guided from the internal space of the rechargeable battery 1002 along the curved surface CS of the terminal plate 400 through the space between the flange portion 410 and the cap plate 300, which is the ventilation channel, to be discharged to the outside, and, thus, a risk of explosion of the rechargeable battery 1002 may be suppressed.

As described above, in the rechargeable battery 1002 according to an embodiment, since the protrusion 420 of the terminal plate 400 insulation-bonded to the cap plate 300 includes the curved surface CS and the inclined surface IS that extend from the upper surface of the flange portion 410, as the surface of the protrusion 420 passing through the through-hole 310 of the cap plate 300 is closer to the end of the inclined surface IS from the curved surface CS, it becomes farther from the cap plate 300, which is the edge of the through hole 310, and, thus, even if an assembly error occurs in a horizontal direction between the cap plate 300 and the terminal plate 400, it is possible to suppress a short circuit from occurring between the cap plate 300 having the same polarity as the first electrode 110 and the terminal plate 400 having the same polarity as the second electrode 120, which may be both electrode terminals.

That is, even if an assembly error occurs, in the rechargeable battery 1002, a short circuit may be suppressed from occurring between both electrode terminals.

In addition, in the rechargeable battery 1002 according to an embodiment, since the protrusion 420 of the terminal plate 400, which is an electrode terminal, includes the curved surface CS extending from the upper surface of the flange portion 410, even if unintended pressure is applied to the terminal plate 400, a stress due to the pressure is dispersed in the curved surface CS positioned between the protrusion 420 and the flange portion 410, and, thus, it is possible to suppress damage from occurring between the flange portion 410 and the protrusion 420 by the pressure.

That is, the rechargeable battery 1002 is provided that suppresses the electrode terminal from being damaged due to a pressure.

In addition, in the rechargeable battery 1002 according to an embodiment, since the protrusion 420 of the terminal plate 400 insulation-bonded to the cap plate 300 by the thermal-fusion layer 500 includes the curved surface CS extending from the surface of the flange portion 410, when an unintended event (such as a short circuit between both electrodes) occurs in an internal space of the rechargeable battery 1002 such that an internal pressure increases by a gas GA generated due to an increase in temperature in the internal space of the rechargeable battery 1002, the thermal-fusion layer 500 may melt due to the increased temperature and may be discharged to the outside by the internal pressure, such that a space between the flange portion 410 and the cap plate 300 is formed as a ventilation channel, and, at the same time, the internal gas GA may be guided from the internal space of the rechargeable battery 1002 along the curved surface CS of the terminal plate 400 from the internal space of the rechargeable battery 1002 through the space between the flange portion 410 and the cap plate 300, which is the ventilation channel, to be discharged to the outside, and, thus, it is possible to suppress a risk of explosion of the rechargeable battery 1002.

That is, even if the temperature and pressure inside the rechargeable battery 1002 unintentionally increase, in the rechargeable battery 1002, an explosion risk may be suppressed.

While this invention has been described in connection with what are presently considered to be some practical example embodiments, it is to be understood that the invention is not limited to the disclosed embodiments, but, on the contrary, is intended to cover various modifications and equivalent arrangements included within the spirit and scope of the appended claims.

What is claimed is:

1. A button cell comprising:
   an electrode assembly comprising a first electrode, a second electrode, and a separator between the first electrode and the second electrode;
   a case connected to the first electrode and accommodating the electrode assembly, and comprising an opening to receive the electrode assembly;
   a cap plate coupled with the case to cover an outer area of the opening, and comprising a through-hole penetrating upper and lower surfaces of the cap plate to expose a central area of the opening; and
   a terminal plate connected to the second electrode and insulation-bonded to the cap plate via an insulating member arranged between the terminal plate and the cap plate, the terminal plate comprising a flange portion covering the through-hole, and a protrusion penetrating the through-hole from the flange portion,
   wherein the protrusion comprises a curved surface extending from a surface of the flange portion, and
   wherein an inner surface of the cap plate that extends between the upper and lower surfaces so as to define the through-hole is exposed toward the protrusion, an open space being defined from the inner surface of the cap plate to the protrusion such that a gas may pass from an interior of the case through the open space.

2. The button cell of claim 1, wherein the protrusion further comprises an inclined surface extending from the curved surface and penetrating the through-hole.

3. The button cell of claim 2, wherein a first length between the inclined surface and an edge of the through-hole is longer than a second length between the curved surface and the edge of the through-hole.

4. The button cell of claim 1, wherein the insulating member comprises a thermal-fusion layer between the cap plate and the flange portion, and insulation-bonding the cap plate and the flange portion.

5. The button cell of claim 4, wherein the thermal-fusion layer melts at a predetermined temperature.

6. The button cell of claim 1, wherein
   the flange portion is arranged on the cap plate, and
   the protrusion passes through the through-hole from the flange portion to be connected to the second electrode.

7. The button cell of claim 1, wherein
   the flange portion is disposed between the cap plate and the electrode assembly to be connected to the second electrode, and
   the protrusion passes through the through-hole from the flange portion to be exposed to an outside of the cap plate.

8. The button cell of claim 1, wherein the flange portion has a wider area than that of the protrusion.

9. The button cell of claim 1, wherein the flange portion has a thinner thickness than that of the protrusion.

10. The button cell of claim 1, wherein the flange portion and the protrusion are integrally formed.

11. The button cell of claim 1, wherein
    the case and the cap plate have a same polarity as the first electrode, and
    the terminal plate has a same polarity as the second electrode.

12. The button cell of claim 1, wherein
    the electrode assembly further comprises:

a first electrode tab extending from the first electrode to be coupled to the case; and
a second electrode tab extending from the second electrode to be coupled to the terminal plate.

* * * * *